United States Patent [19]

McPherson et al.

[11] Patent Number: 5,505,268
[45] Date of Patent: Apr. 9, 1996

[54] BIDIRECTIONAL FIELD IMPLEMENT

[75] Inventors: Marion E. McPherson; Michael G. McPherson, both of Jamestown, N. Dak.; Kenneth L. Innocent, Sacramento, Calif.; Gary A. Parkos; Roger D. Noska, both of Browerville, Minn.

[73] Assignee: Glenmac, Inc., Jamestown, N. Dak.

[21] Appl. No.: 198,624

[22] Filed: Feb. 18, 1994

[51] Int. Cl.⁶ .......................... A01B 33/02; A01B 33/16
[52] U.S. Cl. .................... 172/123; 172/112; 172/122; 172/124; 172/217; 172/554; 172/307; 172/484; 37/274
[58] Field of Search .................. 37/223, 222, 219; 172/123, 122, 124, 63, 112, 118, 119, 157, 217, 47, 307, 484, 547, 554; 56/504, 17.3, 17.4; 404/90, 92; 171/65, 63

[56] References Cited

U.S. PATENT DOCUMENTS

| | | |
|---|---|---|
| 315,184 | 4/1885 | Taft . |
| 523,134 | 7/1894 | Sullivan . |
| 1,366,068 | 1/1921 | Doane . |
| 1,497,855 | 6/1924 | Joneson . |
| 1,568,439 | 1/1926 | Baxter . |
| 2,222,840 | 11/1940 | Holmes . |
| 2,781,623 | 2/1957 | Anderson ........................ 55/17 |
| 2,787,876 | 4/1957 | Cole .............................. 55/17 |
| 2,886,114 | 5/1959 | Peterson ....................... 172/307 |
| 2,938,586 | 5/1960 | Gaffney ........................ 171/63 |
| 2,941,606 | 6/1960 | Gillette ....................... 172/307 |
| 2,959,201 | 11/1960 | Tourneau ...................... 172/122 |
| 2,971,587 | 2/1961 | Anderson ...................... 171/63 |
| 3,117,631 | 1/1964 | Fahrenholz .................... 171/63 |
| 3,224,347 | 12/1965 | Seaman ........................ 172/112 |
| 3,324,955 | 6/1967 | Perold ......................... 172/136 |
| 3,332,222 | 7/1967 | Heinlein ....................... 56/377 |
| 3,366,081 | 1/1968 | Geiss .......................... 111/1 |
| 3,463,548 | 8/1969 | Kelly .......................... 172/122 |
| 3,465,456 | 9/1969 | Meyer . |
| 3,479,755 | 11/1969 | Schropp . |
| 3,703,210 | 11/1972 | Williams et al. ................ 172/784 |
| 3,739,855 | 6/1973 | Bliss .......................... 171/63 |
| 3,901,169 | 8/1975 | Ribouleau ..................... 172/307 |
| 3,923,101 | 12/1975 | Donohue ........................ 171/63 |
| 3,970,012 | 7/1976 | Jones, Sr. ..................... 172/112 |
| 3,993,141 | 11/1976 | Donohue ........................ 171/63 |
| 4,040,490 | 8/1977 | Anderson ....................... 171/63 |
| 4,221,265 | 9/1980 | Pratt .......................... 171/126 |
| 4,315,546 | 2/1982 | Fahrenholz ..................... 171/65 |
| 4,440,235 | 4/1984 | Colistro ....................... 171/63 |
| 4,496,003 | 1/1985 | Bynum .......................... 171/63 |
| 4,516,639 | 5/1985 | Hammarlund et al. .............. 172/99 |
| 4,555,897 | 12/1985 | Degelman ....................... 56/228 |
| 4,593,426 | 6/1986 | Chrisley ....................... 15/84 |
| 4,785,614 | 11/1988 | Schoenherr ..................... 56/365 |
| 4,811,442 | 3/1989 | Barker ......................... 15/82 |
| 4,878,713 | 11/1989 | Zanetis ........................ 299/39 |
| 4,895,476 | 1/1990 | Vangaever ...................... 404/6 |
| 5,024,280 | 6/1991 | Mork ........................... 172/197 |
| 5,060,732 | 10/1991 | Baskett ........................ 171/63 |
| 5,070,946 | 12/1991 | Herr et al. .................... 171/65 |
| 5,092,409 | 3/1992 | Defrancq ....................... 172/47 |
| 5,133,413 | 7/1992 | Baxter ......................... 171/63 |
| 5,261,218 | 11/1993 | Jones et al. ................... 56/366 |

FOREIGN PATENT DOCUMENTS

| | | | |
|---|---|---|---|
| 1048791 | 2/1979 | Canada ......................... 55/33 |
| 359896 | 3/1990 | European Pat. Off. ............. 172/63 |
| 2725233 | 12/1977 | Germany ........................ 172/112 |
| 646194 | 9/1962 | Italy .......................... 172/123 |

*Primary Examiner*—Randolph A. Reese
*Assistant Examiner*—Spencer Warnick
*Attorney, Agent, or Firm*—Westman, Champlin & Kelly

[57] ABSTRACT

An implement for preparing a field includes a ground engaging device that allows the implement to be pushed or pulled on the field. The ground engaging device includes a reversible roller with projections joined to an outer surface thereof to engage the ground. The projections do not extend along the complete length of the roller but rather a portion thereof thereby reducing the power necessary to rotate the roller. The implement includes reversible guards for keeping the disturbed ground in front of the roller.

16 Claims, 6 Drawing Sheets

BIDIRECTIONAL FIELD IMPLEMENT

BACKGROUND OF THE INVENTION

The present invention relates generally to implements used in ground preparation, for instance, the collection of rocks and other debris from the ground surface. More particularly, the present invention provides an implement which operates bidirectionally in that a ground-engaging roller can be either pushed or towed by a vehicle.

Various implements for soil preparation, such as collecting debris, have been previously advanced. Generally, the implement includes a chassis forming a frame, wheels for supporting the chassis, a roller and drive means typically consisting of gears and a drive chain which connect with a drive shaft from the towing vehicle. These previously advanced soil preparation have allowed for one directional operation only, which has inhibited operators from preparing soil in a given area in the most efficient manner.

SUMMARY OF THE INVENTION

The present invention is a field implement for preparing soil in two opposite directions of movement over the ground using a reversible roller. Use of the reversible roller allows an operator to reduce the number of passes made in the field and thus, enable the operator to prepare the field in less time.

In the embodiment described, the roller is driven by a chain which is connected to a hydraulic motor. The motor is powered from the hydraulic system of a vehicle such as a skid steer loader. The outer surface of the roller preferably includes projections which engage and loosen the soil. In one embodiment, the roller includes longitudinal splines that are attached to the outer surface of the roller at equal angular intervals. The longitudinal splines are oriented parallel to the longitudinal axis, but do not extend along the complete length of the roller from one end to the other end. Instead, each individual spline extends along only a portion of the roller. The splines are grouped into two pluralities with a first plurality mounted in the manner described above, extending from a first end of the roller towards and just past the center of the roller. The second plurality of splines cover the remaining portion of the roller, extending from the other end toward and just past the center of the roller, the splines from the second plurality being interposed between the splines of the first plurality. Orientation of the splines in this manner reduces the torque necessary to rotate the roller since initial contact of each spline and the soil is only along a portion of the roller.

In a second embodiment, the roller includes teeth spaced apart from each other over the outer surface of the roller. The teeth are positioned in lines parallel to the longitudinal axis of the roller, each line comprising discrete teeth spaced apart at equal intervals from each adjacent tooth. The teeth of each adjacent line of teeth are offset from each other to prevent auguring.

In a further preferred embodiment, the field implement can be adjusted so that rocks and debris can either be gathered in piles or formed into windrows. Reversible guards are provided to allow piles to be formed whether the implement is being pushed or pulled.

DETAILED DESCRIPTION OF THE PREFERRED EMBODIMENTS

Figure 1:
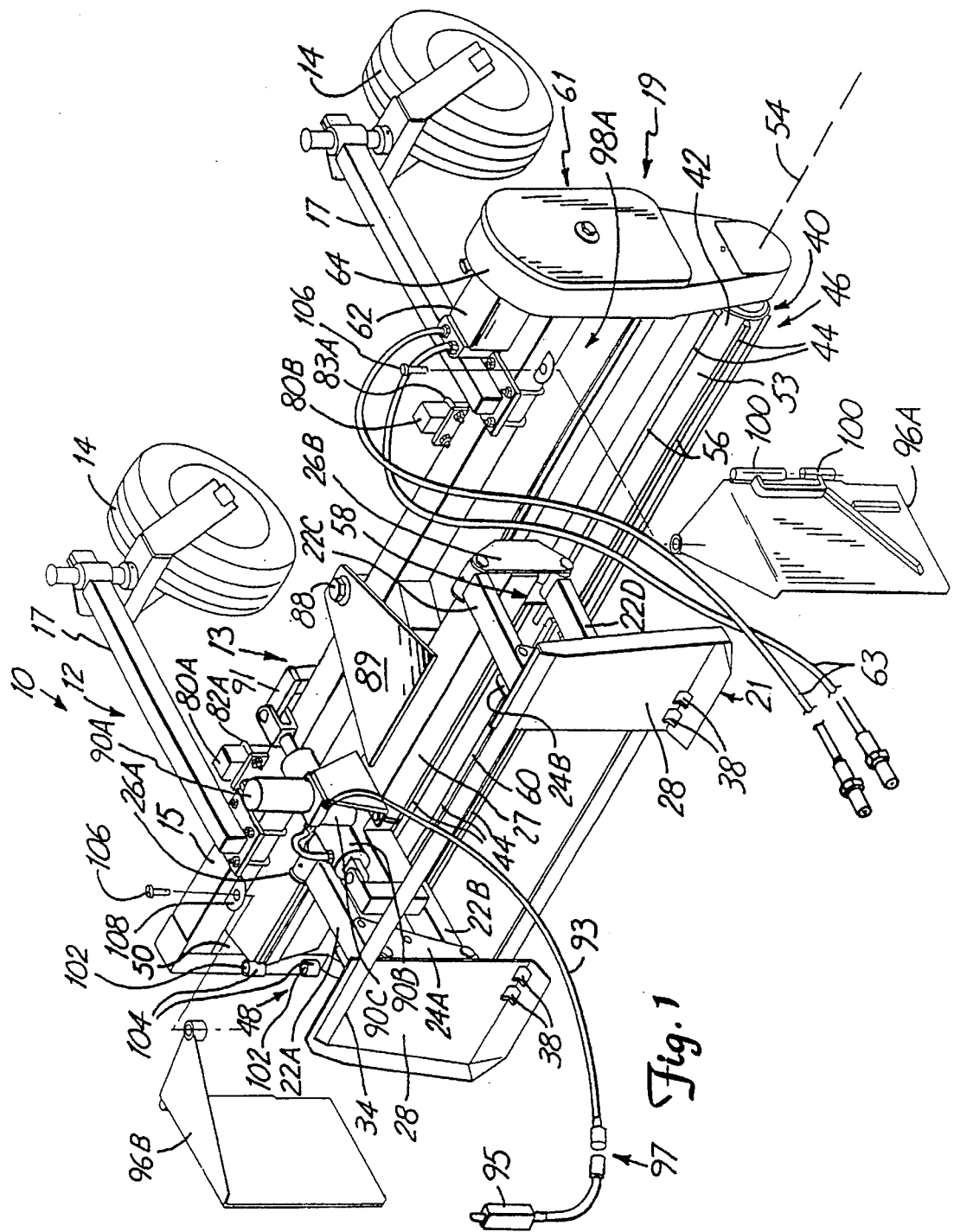
FIG. 1 is a perspective view of the field implement of the present invention.
Figure 5:
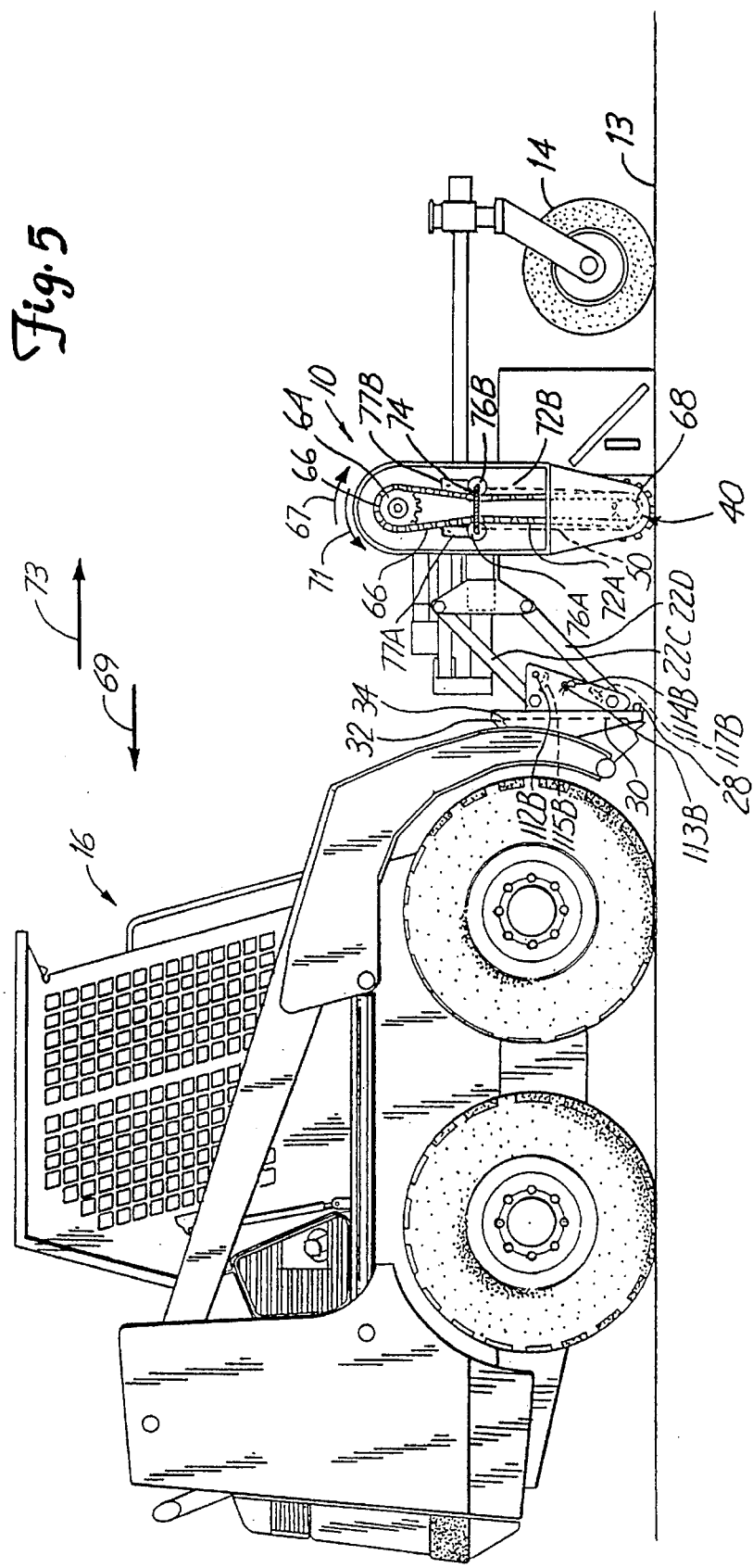
FIG. 5 is a side view of the field implement mounted to a skid steer loader, a cover plate being removed.

A field implement of the present invention is illustrated generally at 10 in FIG. 1. The implement 10 includes a frame 12 having a pivoting subframe 13 with a crossmember 15 and a set of wheel support legs 17, each leg allowing for movement on a ground-engaging pivotal wheel 14. The implement 10 includes a ground engaging device 19 mounted to the frame 12. When pushed or pulled by a vehicle, preferably a skid steer loader 16, as illustrated in FIG. 5, the implement 10 disturbs a field 11. The field 11, as used herein, is any ground surface in need of preparation. For instance, the implement 10 can be used to gather rocks and other debris from the field 11, placing the collected material in manageable piles or windrows for later removal. The implement 10 can also be used simply to till the soil in advance of landscaping. In yet another example, the implement 10 can be used to prepare a beach.

Figure 2:
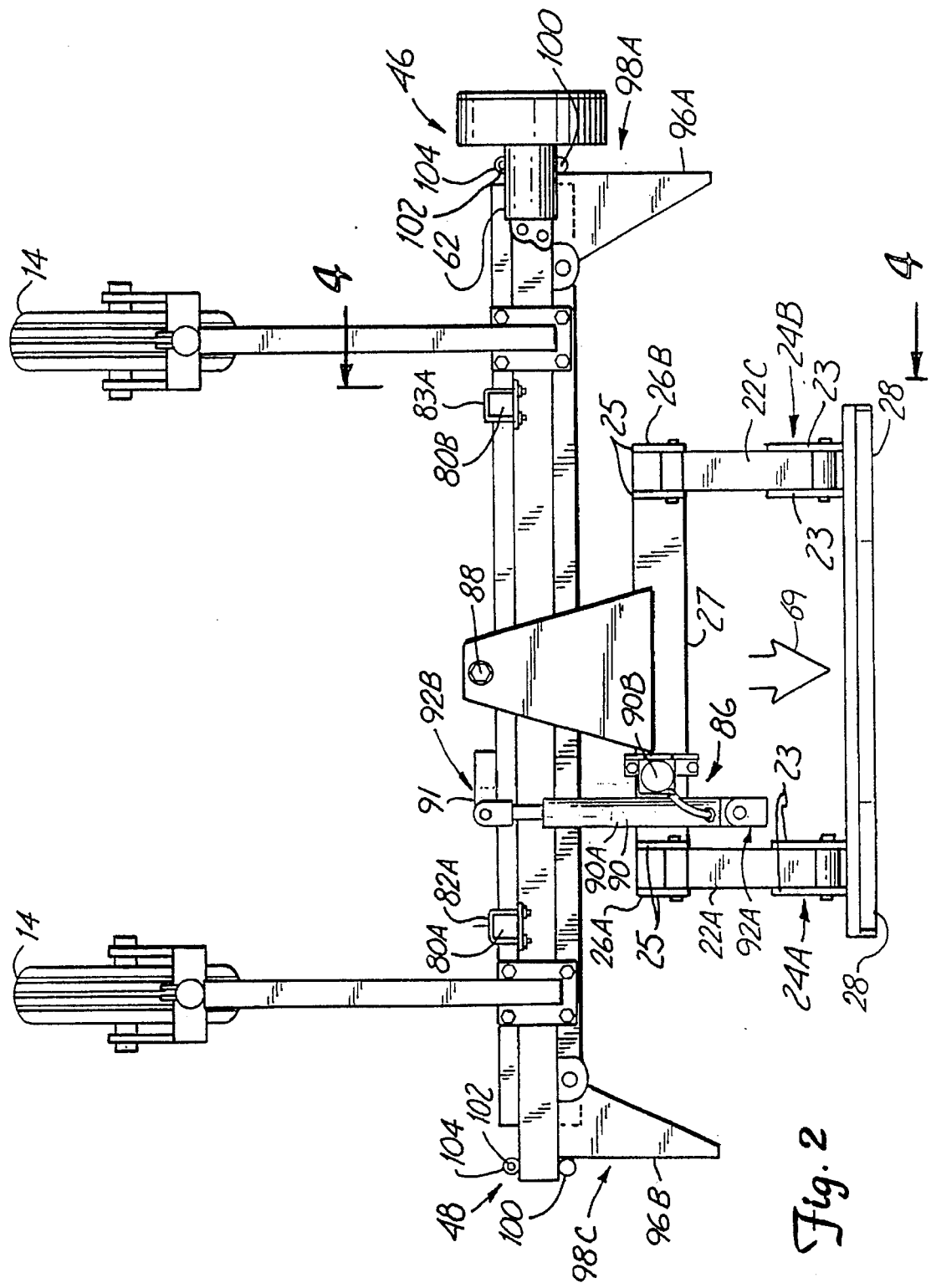
FIG. 2 is a top plan view of the field implement in a first position.
Figure 4:
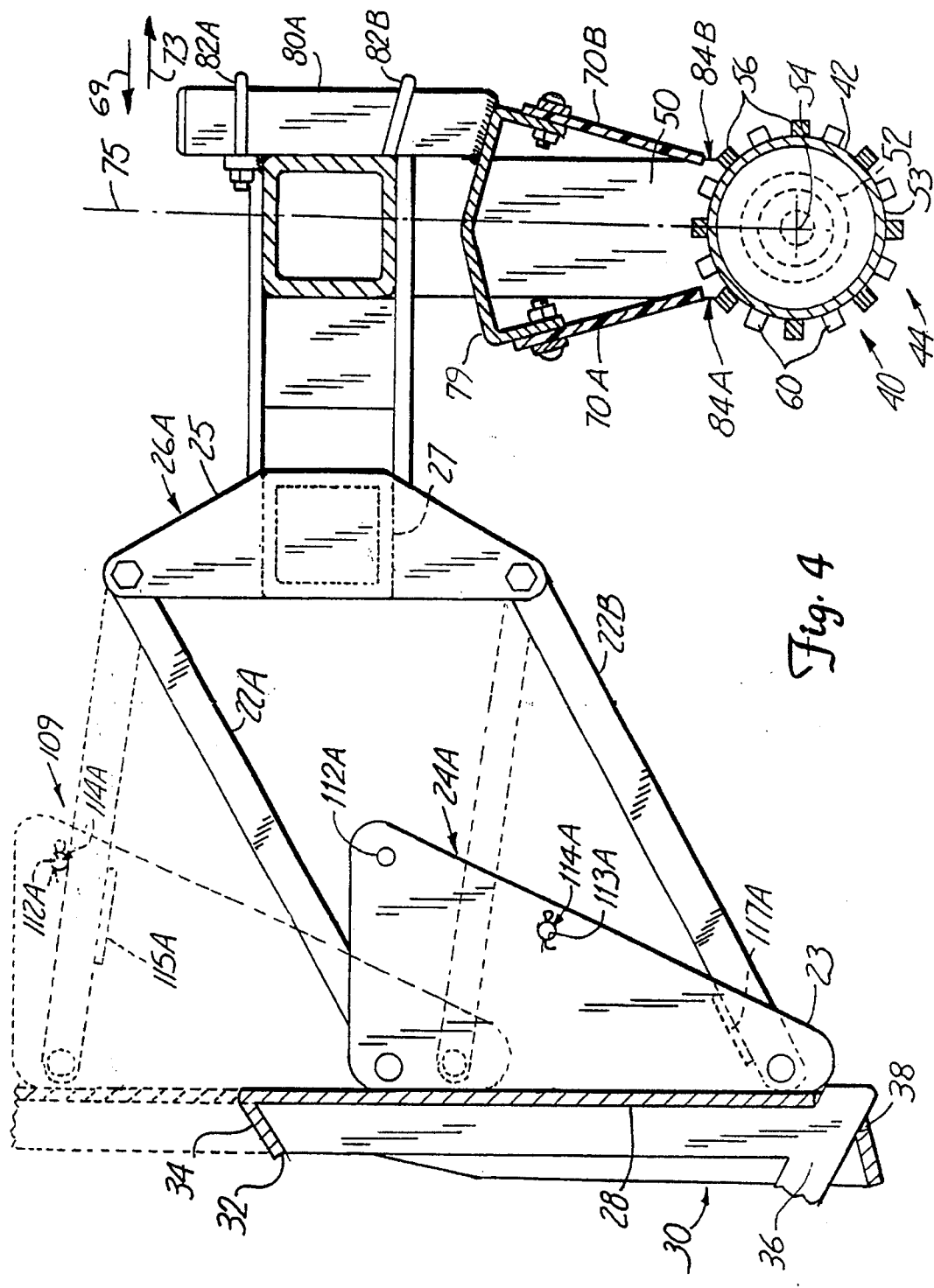
FIG. 4 is a sectional view of the field implement taken along lines 4—4 in FIG. 2 with parts removed.

Referring back to FIG. 1, the frame 12 includes a mounting assembly 21. The mounting assembly 21 comprises a mounting plate 28 that is mounted to the skid steer loader 16 and a crossbeam 27 pivotally joined to the subframe 13. Parallel extension arms 22A, 22B, 22C and 22D connected at opposite ends to the mounting plate 28 and the crossbeam 27 allow the subframe 13 to move vertically relative to the skid steer loader 16. As illustrated in FIGS. 2 and 4, support brackets 24A and 24B each formed from parallel plates 23 are mounted to the mounting plate 28 on a side opposite the skid steer loader 16. Extension arms 22A and 22B are pivotally connected to support bracket 24A, while extension arms 22C and 22D are pivotally connected to the support bracket 24B. At opposite ends of the crossbeam 27 support brackets 26A and 26B are provided. The support brackets 26A and 26B are each formed from parallel plates 25 illustrated in FIG. 2. Extension arms 22A and 22B are pivotally connected to support bracket 26A, while extension arms 22C and 22D are pivotally connected to support bracket 26B.

Preferably, the mounting assembly 21 is designed so that the implement 10 can be easily and quickly fastened to the skid steer loader 16. As illustrated in FIGS. 4 and 5, the mounting plate 28 is fastened to a carriage 30 of the skid steer loader 16, when the bucket (not shown) is removed. The carriage 30 presses against the plate 28 while an upper edge 32 of the carriage 30 fits under a downwardly angled plate member 34. Lower fasteners 36 (FIG. 4) on the carriage 30 project through apertures 38 in the plate 28 and when locked prevent separation of the mounting assembly 21 from the carriage 30. The connection method described above is but one example and is used commonly for devices mounted to skid steer loaders manufactured by Melroe Company of Fargo, N. Dak. The mounting assembly 21 can be adapted for use with other mounting techniques used by other manufactures. For instance, the support brackets 24A and 24B can be joined to suitable mounting plates used by the other manufactures.

As indicated above, the ground engaging device 19 engages the field 11. The ground engaging device 19 includes a reversible ground-engaging roller 40 which rotates to disturb the ground. By rotating the ground-engaging roller 40 in either a clockwise or a counterclockwise direction (as viewed in FIG. 5), the implement 10 can operate when pulled or pushed, respectively, over the field 11, thereby increasing flexibility and decreasing the time necessary to prepare the field 11.

Referring to FIGS. 1 and 4, a first embodiment of the ground-engaging roller has a cylindrical body 42 having a plurality of longitudinal projections or splines 44 attached thereon. The ground-engaging roller 40 is rotatably supported on the subframe 13 between support members 50 having suitable bearings 52.

The plurality of longitudinal splines 44, herein embodied as bars, extend parallel to a rotational axis 54 of the ground-engaging roller 40 and are joined to the outer surface 53 thereof at equal angular intervals. As illustrated in FIG. 1, each spline 44 does not extend along the entire longitudinal length of the ground-engaging roller 40, but rather, extends only along a portion of the outer surface 53. Referring also to FIG. 4, the plurality of longitudinal splines 44 comprise a first plurality of splines 56 that start at the first end 46 of the ground-engaging roller 40 and extend to just beyond a mid-section 58 of the roller 40, and a second plurality of splines 60 starting at the second end 48 of the roller 40 and extending to just beyond the mid-section 58 of the roller 40, the ends of the splines 56 and 60 slightly overlapping at the mid-section or center 58. As best illustrated in FIG. 4, the splines 56 and 60 are interposed with alternating placement of a spline from each plurality about the outer surface 53 at equal angular intervals. Thus, when the ground-engaging roller is rotated, individual splines from each corresponding plurality of splines 56 and 60 strike the ground alternately. Since initial contact is not made along the entire longitudinal length of the roller 40, but rather along only a portion thereof, the amount of power or torque required is reduced.

Preferably, the splines of the first plurality 56 are equal in length to each other as well as equal in length to the splines in the second plurality 60. Each spline not extending substantially past the center 58 of the roller 40.

Figure 6:
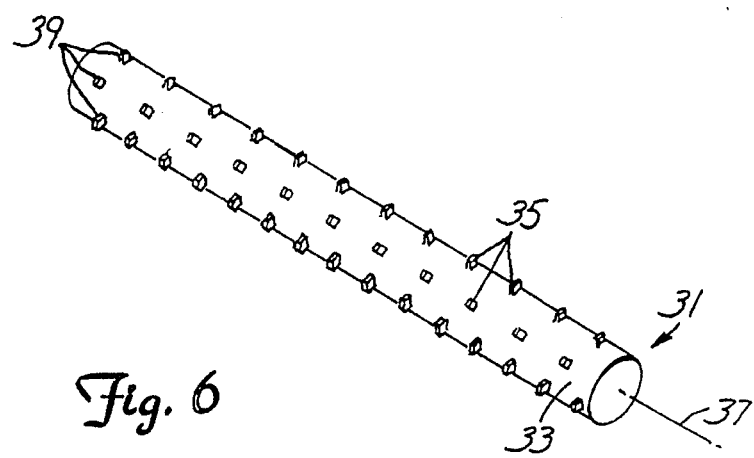
FIG. 6 is a perspective view of a second roller suitable for use in the field implement.

A second embodiment of a roller is illustrated in FIG. 6 at 31. The roller 31 has an outer surface 33 upon which projections or teeth 35 are secured thereto at spaced apart intervals. The teeth 35 are arranged in rows 39 generally parallel to a longitudinal axis 37 of the roller 31 spaced apart at equal angular intervals. Preferably, the teeth of each row 39 are offset from adjacent rows to prevent auguring of the soil as the roller 31 is rotated.

Figure 7:
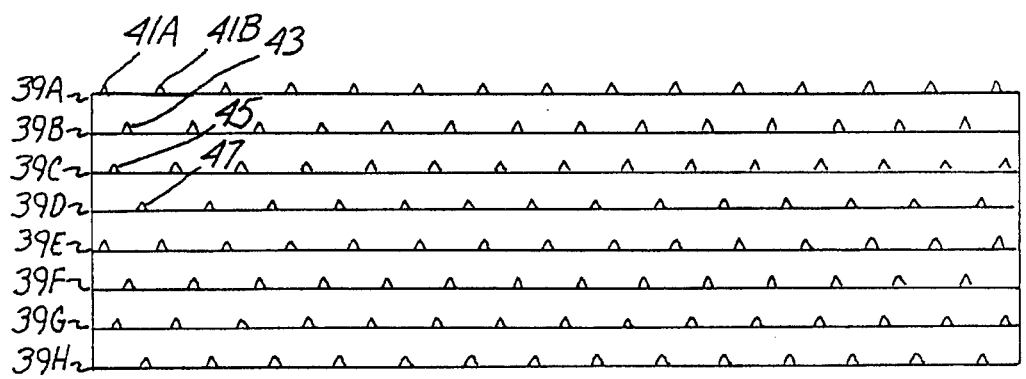
FIG. 7 is a generated representative view of the second roller of FIG. 6.

FIG. 7 schematically illustrates eight rows of teeth 39A, 39B, 39C, 39D, 39E, 39F, 39G and 39H positioned about the outer surface 33 of the roller 31. The spacing between the teeth for each row 39A–39H is approximately equal. The offset spacing of the teeth between the rows 39A–39H is illustrated by comparing the relative position of teeth 41A and 41B in row 39A, tooth 43 of row 39B, tooth 45 of row 39C and tooth 47 of row 39D. As illustrated, the tooth 43 is positioned between the teeth 41A and 41B of row 39A; the tooth 45 is positioned between the tooth 41A of row 39A and the tooth 43 of row 39B; and the tooth 47 is positioned between the tooth 43 of row 39B and the tooth 41B of row 39A. The relative positioning of teeth described above continues throughout rows 39A–39D. The teeth of rows 39E–39H are similarly arranged wherein row 39E corresponds to row 39A, row 39F corresponds to row 39B, row 39G corresponds to row 39C and row 39H corresponds to row 39D. Each of the teeth are formed with a hardened surface to reduce wear.

Referring back to FIG. 1, a drive assembly 61 rotates the ground-engaging roller 40 about the longitudinal axis 54. In the embodiment illustrated, the drive assembly 61 includes a hydraulic motor 62 powered from the skid steer loader 16 through hydraulic lines 63. Referring to FIG. 5, a drive gear 64 attaches to an end of the hydraulic motor 62 and drives a chain 66, which, in turn causes rotation of a follower gear 68. The follower gear 68 is fixedly attached to the ground-engaging roller 40 on the end 46.

The hydraulic motor 62 is reversible so that the rotation of the ground-engaging roller 40 can either be clockwise or counterclockwise. As stated above, the ability to rotate the ground-engaging roller 40 in two directions allows the implement 10 to be operated either when it is pulled or pushed. During clockwise rotation, as indicated by arrow 67 in FIG. 5, which typically occurs when the implement 10 is being pulled by the skid steer loader 16 in a direction indicated by arrow 69, a first portion 72A of the chain 66 is in tension and a second portion 72B is relaxed. When the rotational direction of the hydraulic motor 62 and ground-engaging roller 40 is reversed (counterclockwise) as indicated by arrow 71, which typically occurs when the implement 10 is being pushed by the skid steer loader 16 as indicated by arrow 73, the first portion 72A is relaxed and the second portion 72B is in tension. Idler rollers 76A and 76B joined to pivotal support members 77A and 77B, respectively, contact the chain 66 between the drive gear 64 and the follower gear 68. A spring 74 draws the idler rollers 76A and 76B together to maintain tension on the chain 66 and reduce slack.

As illustrated in FIG. 4, the ground engaging device 19 further includes deflectors 70A and 70B positioned above of the ground-engaging roller 40. The deflectors 70A and 70B are mounted to a support member 79 and positioned on opposite sides of a plane 75 that is generally held perpendicular to the surface of the field 11 and includes the rotational axis 54. Each deflector 70A and 70B is angled slightly downwardly so as to deflect the disturbed ground forwardly of the ground-engaging roller 40 depending on the direction of travel. For instance, if the implement 10 is being towed in a direction indicated by arrow 69, the deflector 70A deflects the disturbed ground, while, if the implement is being pushed in a direction indicated by arrow 73, the deflector 70B deflects the disturbed ground.

A first attachment arm 80A and a second attachment arm 80B (FIG. 2) are joined to the support member 79 and adjustably fix the position of the support member 79 and the deflectors 70A–70B to the subframe 13. The first attachment arm 80A slides through a first U-bolt 82A and a second U-bolt 82B. The second attachment arm 80B slides through two similar U-bolts of which 83A is illustrated in FIG. 1.

Referring back to FIG. 4, between the first deflector 70A and the ground-engaging roller 40 is a first gap 84A, and between the second deflector 70B and the ground-engaging roller 40 is a second gap 84B. Both gaps 84A and 84B allow nonobjectional rocks and debris to pass through and not be deflected, while the objectional rocks and debris are deflected by the corresponding deflector 70A or 70B and accumulate in front of the ground-engaging roller 40. The deflectors 70A and 70B can be selectably positioned at a distance from the ground-engaging roller 40 that the user finds as optimal by adjustment of the attachment arms 80A and 80B. Preferably, the deflectors 70A and 70B are formed of a flexible material.

Figure 3:
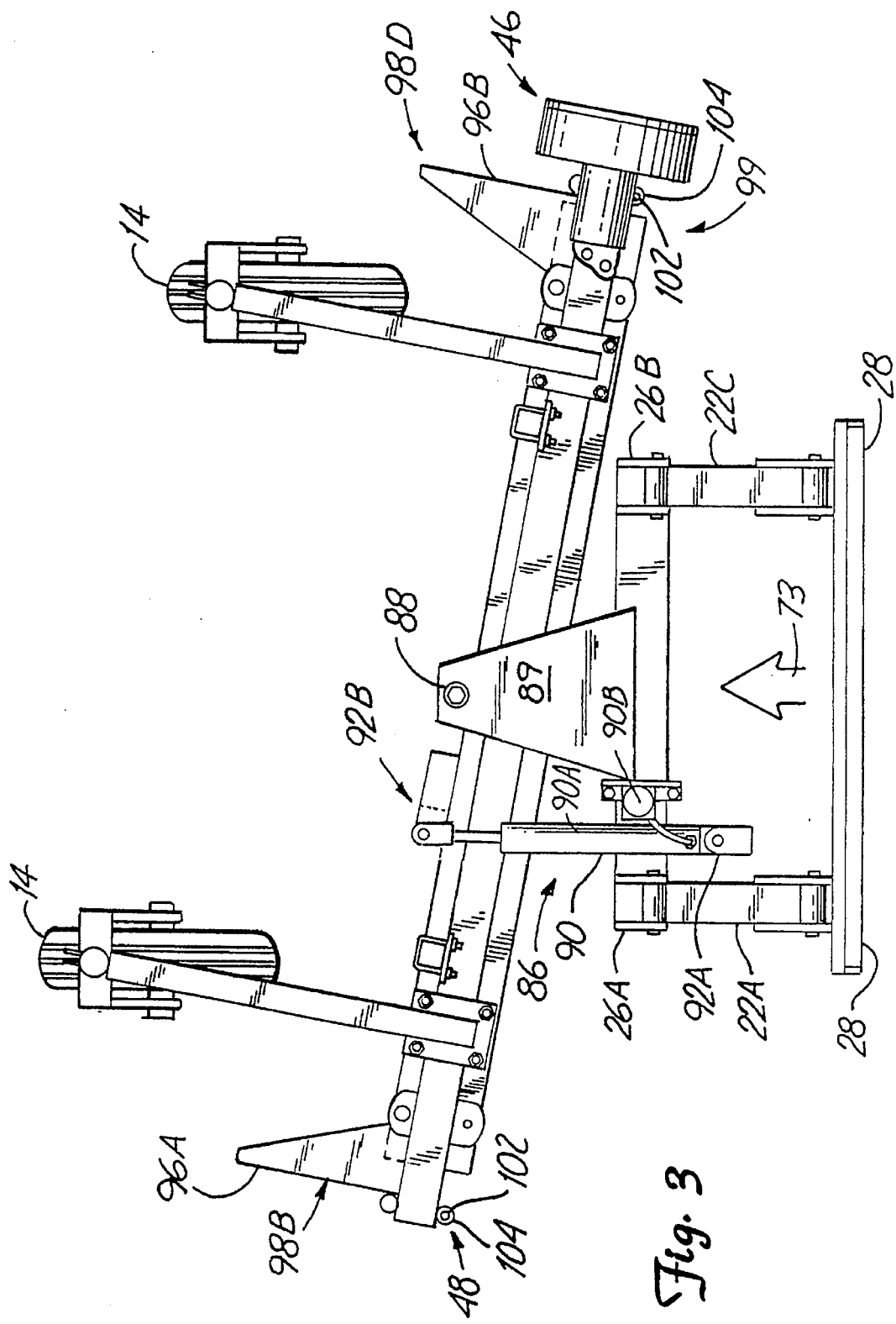
FIG. 3 is a top plan view of the field implement in a second position.

An angular adjustment mechanism 86 allows the implement 10 to function as either a perpendicular device as shown in FIG. 2, or a windrower as shown in FIG. 3. The angular adjustment mechanism 86 includes an actuator 90 having a first end pivotally joined to the crossbar 27 and a second end pivotally joined to a mount 91 of the subframe 13. The subframe 13 pivots about a pivot pin 88 extending through plates 89 fixed to the crossbeam 27 thus allowing angular adjustment of the ground-engaging roller 40 and the deflectors 70A and 70B. When the ground-engaging roller 40 is positioned perpendicular to the direction of motion of the frame as indicated by arrow 69 in FIG. 2, the implement 10 generally keeps the disturbed ground ahead of the roller 40. However, when the ground-engaging roller 40 is positioned diagonally to the direction of motion of the frame 12 as indicated by arrow 73, the implement 10 functions as a windrower by shuffling the disturbed ground off to a trailing side 99 of the implement 10 and forming a windrow (the guard 96B, described below, being removed). It is to be understood that any angle within the range provided by the actuator 90 may be chosen for the roller 40 regardless of whether the implement 10 is being pushed or pulled. The wheels 14 are pivotally attached to the legs 17 so that when the subframe 13 is rotated to a diagonal position, the wheels 14 accordingly pivot so that they still function properly.

Preferably, the actuator 90 comprises an electric over hydraulic power unit attached to a hydraulic actuator 90A. Referring to FIG. 1, control lines 93 extend from an operator switch 95 mounted in the cab of the skid steer loader 16 to an electric motor 90B. The motor 90B operates a hydraulic pump 90C to operate the hydraulic actuator 90A. By operating the switch 95, the operator can remotely adjust the angular displacement of the subframe 13. A plug connection 97 allows connection and disconnection of the control lines 93 for easy installation and removal of the implement 10. Use of the electric over hydraulic actuator 90 instead of a hydraulic actuator powered by the skid steer loader hydraulic lines, which is now commonly used in the art, reduces the number of bulky hydraulic hoses which must extend from the skid steer loader 16 to the implement 10. Furthermore, the skid steer loader hydraulic system need only power the roller 40, thus reducing the load placed on the skid steer loader hydraulic system.

In some operating conditions, it may be desirable to limit upward movement of the ground-engaging roller 40 with respect to the ground. A stop mechanism 109 best illustrated in FIG. 4 limits upward travel of the subframe 13 relative to the mounting plate 28 to accomplish this result. The stop mechanism 109 includes at least one, but preferably, two stop pins 114A (illustrated in FIG. 4) and 114B (illustrated in FIG. 5) positioned to restrict upward pivotal movement of the extension arms 22A and 22C, respectively. Specifically, the support brackets 24A and 24B each include a set of aligned apertures 112A and 112B, respectively, through the parallel plates 25, and stop flanges 115A, 115B, 117A and 117B secured to the inside surface of the plates 25. As illustrated with dashed lines in FIG. 4, when the stop pin 114A is inserted through the apertures 112A and the extension arm 22A is positioned below the aperture 112A, the stop pin 114A limits upward pivoting movement of the extension arm 22A, thus limiting upward movement of the subframe 13 relative to the mounting plate 28, while the stop flange 115A limits downward pivoting movement of the extension arm 22A and thus, downward movement of the subframe 13. If increased upward pivotal movement is desired, the stop pin 114A can be relocated and inserted through lower aligned apertures 113A, the amount of upward pivotal movement being limited by the stop flange 117A. Apertures 113B are provided for stop pin 114B.

In a further preferred embodiment, the implement 10 includes side guards 96A and 96B which can be positioned at opposite ends of the roller 40. The guards 96A and 96B generally prevent flow of the disturbed ground past the ends of the roller 40. As described below, the guards 96A and 96B can be used whether the implement 10 is pushed or pulled.

Referring to FIGS. 2 and 3, the first guard 96A connects either at a first position 98A which is at the first or driving end 46 and facing the mounting plates 28, or at a second position 98B which is at the second end 48 and facing the wheels 14. The second guard 96B connects either at a third position 98C which is at the second end 48 and facing the mounting plate 28, or at a fourth position 98D which is at the driving end 46 and facing the wheels 14. The first guard 96A will be in the first position 98A and the second guard 96B will be in the third position 98C when the implement 10 is being towed, while the first guard 96A will be in the second position 98B and the second guard 96B in the fourth position 98D when the implement 10 is being pushed.

In more detail, each of the guards 96A and 96B connects to the subframe 13 using a set of pins 100 welded to each respective guard. Each pin 100 slides vertically down through suitable apertures 102 of attachment cylinders 104 welded to the subframe 13 at the various positions, where each pin rests with a lower portion in the cylinder and an upper portion exposed where it is welded to the guard.

Pins 106 cooperate with a flange 108 from the subframe 13 hold both of the guards 96A–96B in place once positioned. The guards 96A–96B are easily removable by releasing the pins 106 and then lifting the pins 100 from the cylinders 104.

In summary, the present invention provides a versatile field implement for soil preparation. By using a reversible roller, the implement can be pushed or pulled in the area to be cleared, which can decrease the number of non-preparing passes made by the implement and thus the time necessary to prepare the area. When used as a gathering device, the implement can be adjusted to form windrows of objectional material or with optional guards in place gather the material in piles.

Although the present invention has been described with reference to preferred embodiments, workers skilled in the art will recognize that changes may be made in form and detail without departing from the spirit and scope of the invention.

What is claimed is:

1. A field implement comprising:

a frame supported for movement over a ground surface in a first linear direction and a second linear direction opposite the first linear direction;

a roller rotatably supported on the frame for rotation about an axis of rotation;

drive coupled to the roller for selectively rotating the roller in a first rotational direction about the axis of rotation when the frame is moving in the first linear direction and second rotational direction about the axis of rotation when the frame is moving in the second linear direction; and a guard selectively mounted to the frame on an end of the roller in a first position or a second position, wherein the guard extends in the first linear direction for movement of the frame in the first linear direction while in the first position and in the second linear direction for movement of the frame in the second linear direction while in the second position.

2. The field implement of claim 1 and further comprising a subframe for rotatably supporting the roller, the subframe being pivotally joined to the frame; and angle adjusting means for adjusting the selected angle of the subframe relative to the frame.

3. The field implement of claim 2 wherein the angle adjusting means comprises a hydraulic actuator, a hydraulic pump connected to the hydraulic actuator, and an electric motor for operating the hydraulic pump.

4. The field implement of claim 1 and further comprising a second guard selectively mounted to the frame opposite the first-mentioned guard in a third position or a fourth position, wherein the second guard extends in the first linear direction for movement of the frame in the first linear direction while in the third position and in the second linear direction for movement of the frame in the second linear direction while in the fourth position.

5. The field implement of claim 4 wherein the guards are detachable and are selectively positioned on opposite ends of the roller depending on a selected direction of linear movement of the frame over the ground.

6. The field implement of claim 1 wherein the guard is detachable from the frame between the first and second positions.

7. The field implement of claim 1 wherein the roller includes projections formed on an outer surface thereof about the circumference of the roller, wherein the projections form adjacent rows parallel to the axis of rotation, wherein the projections of a first row are spaced-apart having an offset therebetween along a longitudinal length of the roller, the projections of a second row adjacent to the first row are spaced-apart having the offset therebetween along the longitudinal length of the roller, wherein successive projections of the second row are disposed between successive projections of the first row, and wherein the projections of a third row adjacent the second row are spaced-apart having the offset therebetween along the longitudinal length of the roller, and wherein successive projections of the third row are disposed between adjacent projections of the first and second rows.

8. The field implement of claim 7 wherein the projections form a fourth row adjacent the third row, wherein the projections of the fourth row are spaced-apart having the offset therebetween along the longitudinal length of the roller, and wherein successive projections of the fourth row are disposed between adjacent projections of the first and second rows not having the projections of the third row.

9. The field implement of claim 1 and further comprising a first deflecting plate mounted to the frame above the roller and facing the first linear direction to deflect material in front of the roller for movement in the first linear direction, and a second deflecting plate mounted to the frame above the roller and facing the second linear direction to deflect material in front of the roller for movement in the second linear direction.

10. The field implement of claim 9 wherein the first deflecting plate and the second deflecting plate are flexible.

11. The field implement of claim 1 further comprising:

a mounting plate for connecting the field implement to a vehicle;

at least one pair of mounting arms, the pair of mounting arms pivotally connected to the frame and pivotally connected to the mounting plate;

a first stop engagable by a mounting arm to limit downward movement of the arms relative to the mounting plate, the first stop being fixed to the mounting plate; and a second stop engagable by a mounting arm in a position on the mounting plate to limit upward movement of the arms relative to the mounting plate, the second stop being removable from the position to allow increased upward movement of the arms relative to the mounting plate.

12. The field implement of claim 11 having two pairs of mounting arms.

13. A field implement comprising:

a frame supported for movement over a ground surface in a first linear direction and a second linear direction;

a roller rotatably supported on the frame for rotation about an axis of rotation;

a drive coupled to the roller for selectively rotating the roller in a first and second rotational direction about the axis of rotation;

a deflector assembly adjustably fixed to the frame above the roller and having a first deflector facing the first linear direction to deflect material in front of the roller for movement in the first linear direction and a second deflector facing the second linear direction to deflect material in front of the roller for movement in the second linear direction; wherein adjustment of the deflector assembly on the frame simultaneously adjusts a distance between the deflectors and the roller.

14. The field implement of claim 13 and further comprising a subframe for rotatably supporting the roller, the subframe being pivotally joined to the frame; and angle adjusting means for adjusting the selected angle of the subframe relative to the frame, the angle adjusting means being connected between the frame and the subframe.

15. The field implement of claim 13 and further comprising:

a mounting plate for connecting the field implement to a vehicle;

two pairs of mounting arms, the pairs of mounting arms pivotally connected to the frame and pivotally connected to the mounting plate;

a first stop engagable by a mounting arm to limit downward movement of the arms relative to the mounting plate, the first stop being fixed to the mounting plate; and a second stop engagable by a mounting arm in a position on the mounting plate to limit upward movement of the arms relative to the mounting plate, the second stop being removable from the position to allow increased upward movement of the arms relative to the mounting plate.

16. The field implement of claim 13 and further comprising a guard attached to the frame at each end of the roller for keeping disturbed ground in front of the roller.

* * * * *

UNITED STATES PATENT AND TRADEMARK OFFICE
CERTIFICATE OF CORRECTION

PATENT NO. : 5,505,268
DATED : April 9, 1996
INVENTOR(S) : McPherson et al.

It is certified that error appears in the above-indentified patent and that said Letters Patent is hereby corrected as shown below:

Page 1 of 1

Column 6, line 61, before "drive" insert --a--.

Signed and Sealed this

Twenty-eighth Day of January, 1997

Attest:

BRUCE LEHMAN

Attesting Officer     Commissioner of Patents and Trademarks